(12) United States Patent
Schaumann

(10) Patent No.: US 8,734,044 B2
(45) Date of Patent: May 27, 2014

(54) BALL JOINT WITH AN ELASTIC BEARING SHELL

(75) Inventor: Lothar Schaumann, Ratingen (DE)

(73) Assignee: TRW Automotive GmbH, Alfdorf (DE)

( * ) Notice: Subject to any disclaimer, the term of this patent is extended or adjusted under 35 U.S.C. 154(b) by 211 days.

(21) Appl. No.: 12/522,752

(22) PCT Filed: Dec. 11, 2007

(86) PCT No.: PCT/EP2007/010832
§ 371 (c)(1),
(2), (4) Date: Oct. 26, 2009

(87) PCT Pub. No.: WO2008/083808
PCT Pub. Date: Jul. 17, 2008

(65) Prior Publication Data
US 2010/0092235 A1    Apr. 15, 2010

(30) Foreign Application Priority Data
Jan. 12, 2007 (DE) .......................... 10 2007 001 933

(51) Int. Cl.
*F16C 11/00* (2006.01)
*F16C 11/06* (2006.01)
*F16C 11/08* (2006.01)

(52) U.S. Cl.
CPC ......... *F16C 11/0633* (2013.01); *F16C 11/0638* (2013.01); *F16C 11/0671* (2013.01); *F16C 11/086* (2013.01)
USPC .......................... 403/133; 403/132; 403/138

(58) Field of Classification Search
CPC ............. F16C 11/0633; F16C 11/0638; F16C 11/0671; F16C 11/086
USPC ......... 403/129, 132, 133, 135, 136, 137, 138, 403/144; 384/203, 206
See application file for complete search history.

(56) References Cited

U.S. PATENT DOCUMENTS 3,089,718 A     5/1963   Gottschald et al.
3,561,800 A *  2/1971   Hassan ........................... 403/34
(Continued)

FOREIGN PATENT DOCUMENTS

DE    1678052 U    6/1954
DE    1168174 B    4/1964
(Continued)

OTHER PUBLICATIONS

German Search Report dated Sep. 19, 2008 for Priority Application DE 10 2007 001 933.7.

(Continued)

*Primary Examiner* — Daniel P. Stodola
*Assistant Examiner* — Jonathan Masinick
(74) *Attorney, Agent, or Firm* — MacMillan, Sobanski & Todd, LLC

(57) ABSTRACT

A ball joint, particularly a radial ball joint, includes a housing, a bearing shell which is arranged in the housing, and a ball pin having a ball head which is arranged in the bearing shell, the housing having a mounting opening to receive the bearing shell and the ball head, the mounting opening being closed by a housing cover which is fastened to the housing. The bearing shell is deformed by the ball head and the housing cover such that the restoring force resulting from the deformation urges the ball head away from the housing cover and prestresses it against the housing.

12 Claims, 4 Drawing Sheets

(56) References Cited

U.S. PATENT DOCUMENTS

| | | | |
|---|---|---|---|
| 3,953,139 A | | 4/1976 | Uchida |
| 4,430,016 A | * | 2/1984 | Matsuoka et al. ............... 403/40 |
| 4,720,205 A | * | 1/1988 | Ito ................................. 403/140 |
| 5,067,841 A | * | 11/1991 | Fukukawa et al. ............ 403/140 |
| 5,509,748 A | * | 4/1996 | Idosako et al. ................ 403/133 |
| 6,152,640 A | * | 11/2000 | Oda et al. ...................... 403/133 |
| 6,164,861 A | | 12/2000 | Maughan |
| 6,688,799 B2 | * | 2/2004 | Broker et al. .................. 403/135 |
| 6,773,196 B2 | * | 8/2004 | Broker et al. .................. 403/133 |
| 7,753,611 B2 | * | 7/2010 | Ergodan ......................... 403/138 |
| 7,762,736 B2 | * | 7/2010 | Ersoy et al. .................... 403/122 |

FOREIGN PATENT DOCUMENTS

| | | |
|---|---|---|
| EP | 0231479 A2 | 8/1987 |
| EP | 0638735 A1 | 2/1995 |
| EP | 0924441 A1 | 6/1999 |
| GB | 924029 | 4/1963 |

OTHER PUBLICATIONS

Search Report with the written opinion of the International Searching Authority dated Jul. 2, 2008 for PCT/EP2007/010832.

* cited by examiner

BALL JOINT WITH AN ELASTIC BEARING SHELL

CROSS-REFERENCE TO RELATED APPLICATIONS

This application is a national stage of International Application No. PCT/EP2007/010832 filed Dec. 11, 2007, the disclosures of which are incorporated herein by reference in entirety, and which claimed priority to German Patent Application No. 10 2007 001 933.7 filed Jan. 12, 2007, the disclosures of which are incorporated herein by reference in entirety.

BACKGROUND OF THE INVENTION

The invention relates to a ball joint, particularly a radial ball joint, including a housing, a bearing shell which is arranged in the housing, and a ball pin having a ball head which is arranged in the bearing shell, the housing having a mounting opening to receive the bearing shell and the ball head, the mounting opening being closed by a housing cover which is fastened to the housing.

Radial ball joints are used in vehicles, for example, and must receive high radial forces at low axial forces and large tilting angles. The wear occurring over the working life of the radial ball joints can lead to the ball joint causing noises during driving, due to free play in the joint.

In order to prevent this free play in the joint, a ball joint 11' is known from the prior art (cf. FIG. 4), in which separate prestressed spring elements 13' are provided between the housing cover 22' and the bearing shell 10' in the assembled state of the joint. Through the prestressing of the spring elements 13' (two plate springs in FIG. 4), the bearing shell 10' is pressed against the ball head 28' of the ball pin 26', so that even when wear of the bearing shell 10' occurs, a constant contact exists between the bearing shell 10' and the ball pin 26', and no free play occurs between the ball head 28' and the bearing shell 10'.

BRIEF SUMMARY OF THE INVENTION

It is a feature of the invention to provide a ball joint, particularly a radial ball joint, in which no free play occurs in the joint through wear of the bearing shell, the ball joint being intended to be particularly compact and able to be produced simply and at a favorable cost.

According to the invention, this feature is achieved by a ball joint of the type initially mentioned, in which the bearing shell is deformed elastically by the ball head and the housing cover such that the restoring force resulting from the deformation urges the ball head away from the housing cover and prestresses it against the housing. The function of the usual separate spring elements in the prior art is undertaken by the bearing shell in the ball joint according to the invention, so that separate spring elements can be dispensed with. The ball joint thereby becomes more compact as a whole and simpler in its construction and able to be produced at a more favorable cost.

In one embodiment, the ball head and the bearing shell have at least partially opposed curvatures before the housing cover is installed. The ball head is thereby prevented from lying with its full surface against the bearing shell in this region without a deformation of the bearing shell. The elastic deformation of the bearing shell is consequently not only a material compression maintaining the shape of the bearing shell, but (also) an actual alteration of the shell shape, i.e. the contour of the bearing shell. Through this change in shape, a relatively large deformation path is possible, without the joint having to be constructed so as to be particularly stiff or the bearing shell having to be constructed so as to be particularly thick. Consequently, even more intensive wear phenomena can be compensated, without a free play occurring in the joint.

In this embodiment, a portion of the bearing shell which is curved in opposition to the ball head can act as an annular spring which urges the ball head relative to the housing in a direction of a longitudinal axis of the ball joint. The bearing shell thereby undertakes the function of a spring element which prestresses the ball head in the housing. Hitherto, separate spring elements, for example plate springs, were usually provided for this.

In its non-deformed initial state, the bearing shell preferably has a substantially cylindrical side wall and an end wall adjacent to the housing cover. The end wall is particularly preferably prestressed here between the housing and the housing cover in the manner of a plate spring. The spring stiffness is thereby established by a precisely defined bearing shell section. The subsequent restoring force which urges the ball head away from the housing cover can be adjusted precisely accordingly through the construction of the end wall.

In particular, viewed in a longitudinal section through the ball joint, the ball head and the end wall of the bearing shell can be oppositely curved, at least partially.

In a further embodiment, the end wall of the bearing shell has a central opening, a rim of the opening forming a ring-shaped cover contact surface with the housing cover in the assembled state of the ball joint. The bearing shell, particularly the end wall of the bearing shell, is deformed and prestressed during the installation of the housing cover, through a displacement of this opening rim.

A reinforcement ring can be formed integrally with the rim of the opening here, to increase the size of the ring-shaped cover contact surface. The opening rim constitutes a support of the end wall of the bearing shell, acting as a spring, on the housing cover. With the spring support being reinforced, the boundary conditions of the end wall are established more precisely, so that a restoring force can be adjusted better.

The end wall preferably forms a ring-shaped ball head contact surface with the ball head between the ring-shaped cover contact surface and the side wall. Through this ring-shaped ball head contact surface, the bearing shell acts upon the ball head with the restoring force which urges the ball head away from the housing cover and prestresses it against the housing.

Other advantages of this invention will become apparent to those skilled in the art from the following detailed description of the preferred embodiments, when read in light of the accompanying drawings.

DETAILED DESCRIPTION OF THE INVENTION

Figure 1:
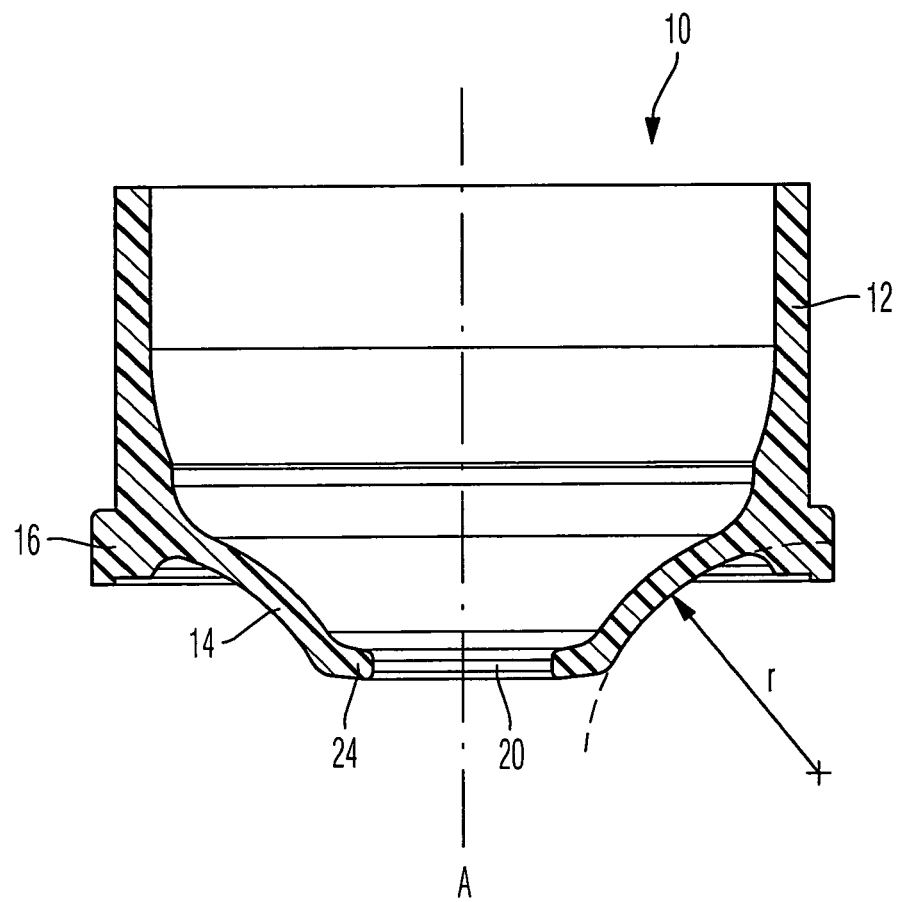
FIG. 1 shows a longitudinal section through a bearing shell of a ball joint according to the invention in a non-deformed initial state.

FIG. 1 shows a bearing shell 10 for a ball joint 11 (FIGS. 2 and 3) in a non-deformed initial state. The bearing shell 10 is at least partially elastic and is preferably formed from an elastic plastic material. In the embodiment which is illustrated, it has a substantially cylindrical side wall 12 and an end wall 14 adjacent thereto. A transition region between the side wall 12 and the end wall 14 is constructed so as to be reinforced and has a projection 16 via which the bearing shell 10 is fixed to a housing 18 in an assembled state of the ball joint 11 (FIG. 3). This transition region thereby acts as a fixed support for the curved end wall 14. Viewed from the exterior, the end wall 14 is constructed so as to be concave and, in the present example, has a radius of curvature r. In addition, it has a central opening 20, with a rim of the opening 20 forming a ring-shaped cover contact surface with a housing cover 22 in the assembled state of the ball joint (FIG. 3). The rim of this opening 20 forms a further support for the curved end wall 14 which acts as a spring. The more precisely the limiting or support conditions are set for the end wall 14, the more precisely the desired restoring force can be adjusted. Therefore, the further support is also constructed so as to be reinforced, by a reinforcement ring 24 being formed integrally with the rim of the opening 20 to increase the size of the ring-shaped cover contact surface.

Figure 2:
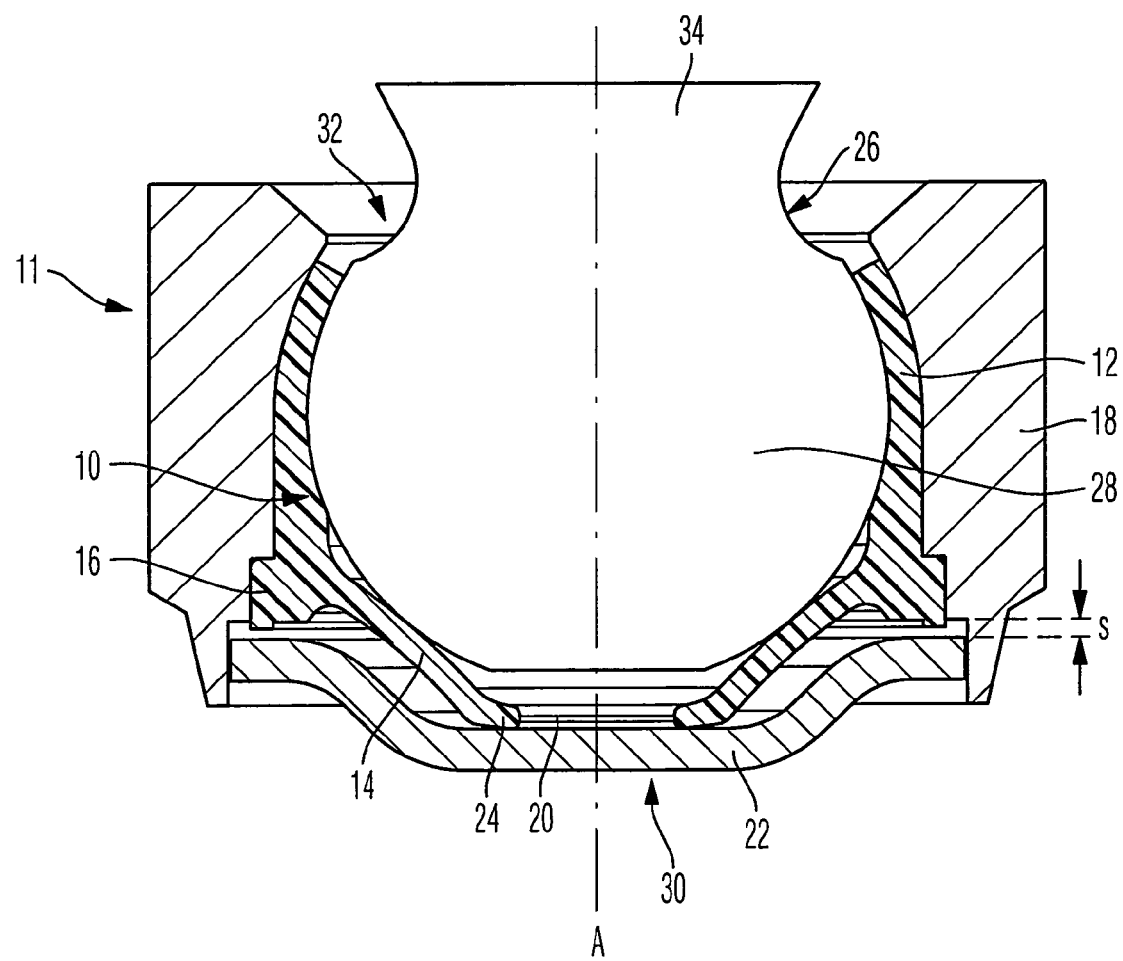
FIG. 2 shows a longitudinal section through a ball joint according to the invention, in which a housing cover is put in place but is not yet fastened to the housing.
Figure 3:
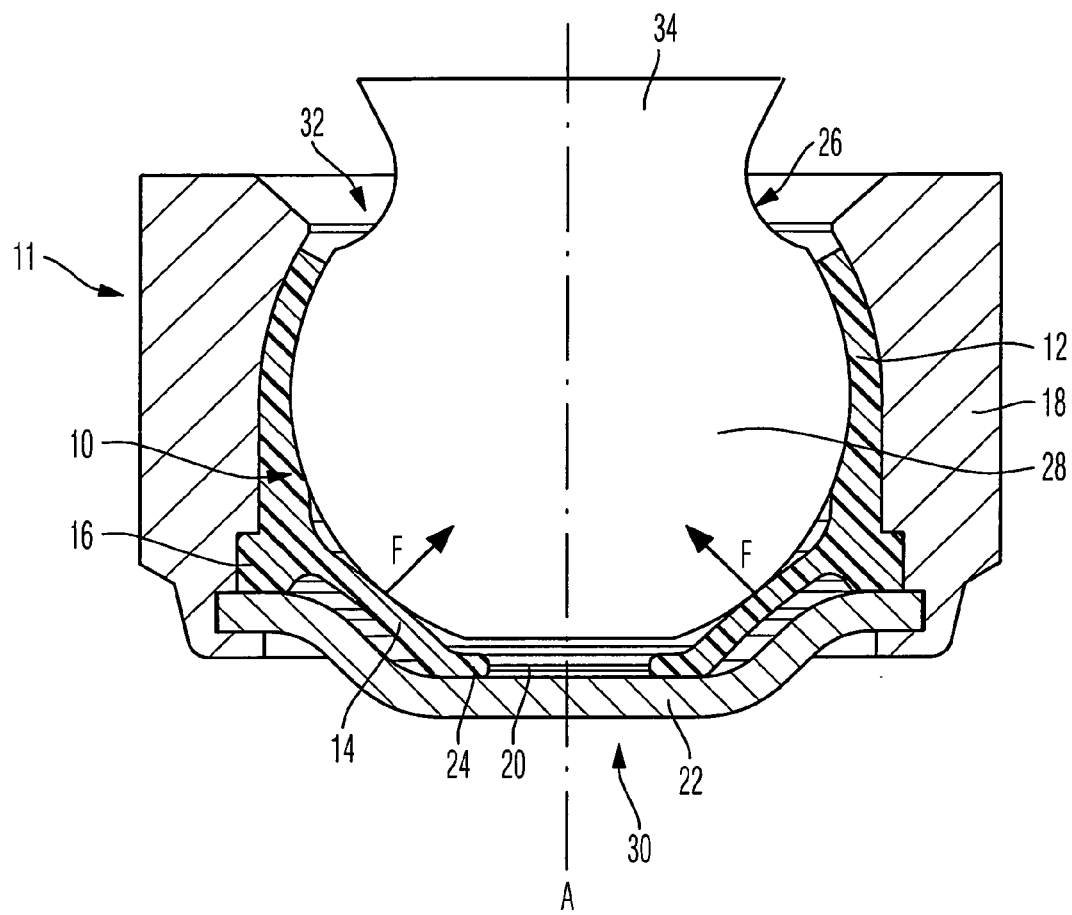
FIG. 3 shows a longitudinal section through a ball joint according to the invention in a finished mounted state, in which the housing cover is fastened to the housing.
Figure 4:
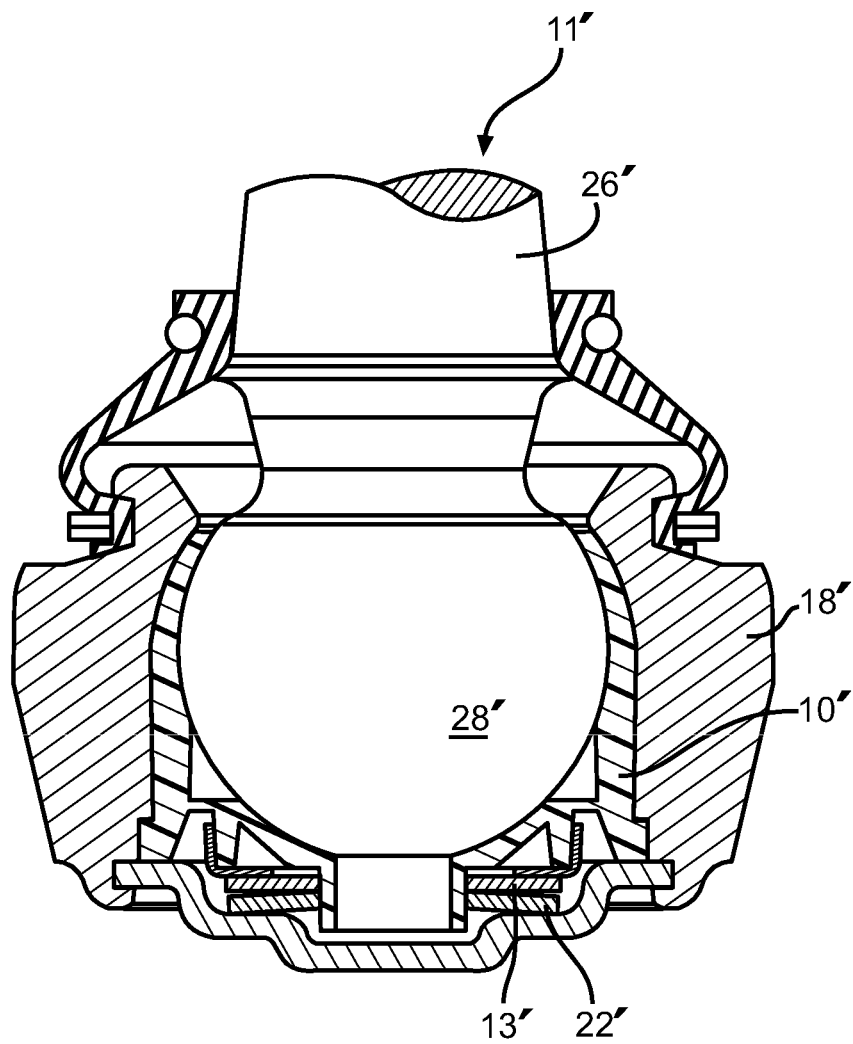
FIG. 4 shows a longitudinal section through a ball joint according to the prior art.

In FIG. 2, a ball joint 11, more precisely a radial ball joint, is illustrated, with a housing 18 in which the bearing shell 10 is arranged, and with a ball pin 26 with a ball head 28, the ball head 28 being arranged in the bearing shell 10. A mounting opening 30, which is closed by the housing cover 22 after the receiving of the bearing shell 10 and of the ball head 28, is provided in the housing 18 to receive the bearing shell 10 and the ball head 28. Opposite the mounting opening 30, the housing 18 has in addition a pin opening 32 through which a pin section 34 of the ball pin 26 extends to outside the housing 18. The mounting opening 30 and the pin opening 34 are generally circular openings, the diameter of the mounting opening 30 being greater than the diameter of the ball head 28 and the diameter of the pin opening 34 being smaller than the diameter of the ball head 28. The central points of the mounting opening 30, of the pin opening 34 and of the opening 20 in the bearing shell all lie here on a longitudinal axis A of the ball joint 11.

In FIG. 2, the housing cover 22 is already placed onto the housing 18, but is not yet fastened to the housing 18. It is at a distance in the axial direction by an amount s from its final position in the assembled state of the ball joint 11, so that the bearing shell 10, particularly the end face 14 of the bearing shell 10, is not yet, or is only negligibly prestressed.

The side wall 12 of the bearing shell 10 already lies substantially with its entire surface against the housing 18 and against the ball head 28, it being slightly deformed with respect to its cylindrical initial state (FIG. 1). On the other hand, it can be seen in FIG. 2, but also in the finished assembled state of the ball joint 11 in FIG. 3, that the space between the ball head 28 and the housing cover 22 is not completely filled by the end wall 14 of the bearing shell 10. Viewed in the longitudinal section, the end wall 14 is curved partially in opposition to the ball head 28 in this region, only lies with a rim of the end wall opening against the housing cover 22, and forms a ring-shaped cover contact surface with the housing cover 22. The end wall 14 touches the ball head 28 between this ring-shaped cover contact surface and the side wall 12, and forms a ring-shaped ball head contact surface with the ball head 28. The transition region between the side wall 12 and the end wall 14 of the bearing shell 10 and the rim of the opening 20 in the end wall 14 form supports for the end wall 14 of the bearing shell 10, which is constructed as a spring. In order to obtain boundary conditions which are as defined as possible, the bearing shell 10 is constructed with reinforcements in these regions. Thus, the externally encircling projection 16 is formed on in the transition region between the side wall 12 and the end wall 14, the projection 16 engaging into a recess of the housing 18. After the housing cover 22 is fastened to the housing 18 (FIG. 3), the projection 16 is pressed into the recess by the housing cover 22 such that the transition region between the side wall 12 and the end wall 14 of the bearing shell 10 is fixed at least in the direction of the longitudinal axis A. A reinforcement ring 24 to increase the size of the ring-shaped cover contact surface is formed integrally with the rim of the opening of the end wall 14. This reinforcement on the opening rim also contributes to defined boundary conditions of the end wall 14 which is constructed as a spring.

Proceeding from FIG. 2, the housing cover 22 is moved in the axial direction by the amount s towards the housing 18 and is fastened so that the finished mounted ball joint 11 is produced in accordance with FIG. 3. The end wall 14 of the bearing shell 10 is prestressed here in the manner of a plate spring and is deformed elastically, the restoring force that results from the deformation urging the ball head 28 away from the housing cover 22 and prestressing it against the housing 18. In addition to a material compression in the end wall 14, the deformation also comprises here an actual change in shape of the end wall 14, in which the radius of curvature r (cf. FIG. 1) increases in size. This deformation can be so great here that after the housing cover 22 is fastened, the end wall 14 no longer has a curvature, viewed in the longitudinal section of the ball joint, and assumes substantially a shape in the manner of a frustum. The end wall 14 rests against the housing 18 and also against the housing cover 22 by means of the supports in the region of the projection 16 and of the reinforcement ring 24, and acts upon the ball head 28 via the ring-shaped ball head contact surface in the direction of the arrows F (FIG. 3). Viewed over the entire ring-shaped ball head contact surface, the force components which do not act in the axial direction cancel each other here, so that towards the pin opening 32, a resulting force acts in the axial direction onto the ball head 28. Consequently, when wear occurs, no free play occurs in the joint, but rather the end wall 14 deforms increasingly back into its initial position according to FIG. 1 and provides for a permanent contact between the ball head 28 and the bearing shell 10.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:
1. A ball joint comprising
a housing,
a bearing shell which is arranged in the housing, and
a ball pin having a ball head which is arranged in the bearing shell,
the housing having a mounting opening to receive the bearing shell and the ball head, the mounting opening being closed by a housing cover which is fastened to the housing,
wherein the bearing shell has a side wall and an end wall, the end wall having a first end and an opposite second end, the first end connected to the side wall by a first reinforcement portion and the second end having a second reinforcement portion extending therefrom, the second reinforcement portion including generally parallel, radially extending inner and outer surface portions; and wherein the first and second reinforcement portions are configured to not contact the ball head but only contact at least a portion of the cover, wherein the end wall includes an outer surface portion which is disposed adjacent an inner surface portion of the cover and an inner surface portion which is disposed directly adjacent to and is curved in opposition relative to an outer surface portion of the ball head, wherein the outer surface portion of the end wall is curved and has an initial, constant radius of curvature between the first and second reinforcement portions in a non-deformed initial state, wherein the outer surface portion of the end wall is configured to be spaced apart to not contact the inner surface portion of the cover and the curved in opposition inner surface portion of the end wall only contacts the outer surface portion of the ball head in an assembled state whereby the end wall is deformed elastically by the ball head such that the end wall provides a restoring force resulting from the deformation which urges the ball head away from the housing cover, and wherein the second reinforcement portion of the bearing shell has a central opening, a rim of the opening forming a circumferentially extending ring-shaped cover contact surface with the housing cover in the assembled state of the ball joint.

2. The ball joint according to claim 1, wherein the ball head and the bearing shell have at least partially opposed curvatures before the housing cover is installed and after the housing cover is installed.

3. The ball joint according to claim 1, wherein the bearing shell in a non-deformed initial state has a substantially cylindrical side wall.

4. The ball joint according to claim 3, wherein the ball head and the end wall of the bearing shell, viewed in a longitudinal section through the ball joint, are at least partially oppositely curved.

5. The ball joint according to claim 1, wherein the end wall forms a circumferentially extending ring-shaped ball head contact surface with the ball head between the circumferentially extending ring-shaped cover contact surface and the side wall.

6. The ball joint according to claim 1, wherein the first reinforcement portion is a projection which is configured to be fixed to the housing to thereby provide a fixed support for the first end of the end wall of the bearing shell.

7. The ball joint according to claim 1, wherein in an assembled state deformation of the end wall occurs and causes an actual change in shape of the end wall in which the radius of curvature increases in size from the initial radius of curvature.

8. A ball joint comprising
a housing,
a bearing shell which is arranged in the housing, and
a ball pin having a ball head which is arranged in the bearing shell,
the housing having a mounting opening to receive the bearing shell and the ball head, the mounting opening being closed by a housing cover which is fastened to the housing,
wherein the bearing shell has a side wall and an end wall, the end wall having a first end and an opposite second end, the first end connected to the side wall by a first reinforcement portion and the second end having a second reinforcement portion extending therefrom, the second reinforcement portion including generally parallel, radially extending inner and outer surface portions,
wherein the first and second reinforcement portions are configured to not contact the ball head but only contact at least a portion of the cover, wherein the end wall includes an outer surface portion which is disposed adjacent an inner surface portion of the cover and an inner surface portion which is disposed directly adjacent to and is curved in opposition relative to an outer surface portion of the ball head, wherein the outer surface portion of the end wall is curved and has an initial, constant radius of curvature between the first and second reinforcement portions in a non-deformed initial state, wherein the outer surface portion of the end wall is configured to be spaced apart to not contact the inner surface portion of the cover and the curved in opposition inner surface portion of the end wall only contacts the outer surface portion of the ball head in an assembled state whereby the end wall is deformed elastically by the ball head such that the end wall provides a restoring force resulting from the deformation which urges the ball head away from the housing cover and prestresses the ball head in a direction towards the housing,
wherein the bearing shell in a non-deformed initial state has a substantially cylindrical side wall,
wherein the second reinforcement portion of the bearing shell has a central opening, a rim of the opening forming a circumferentially extending ring-shaped cover contact surface with the housing cover in the assembled state of the ball joint, and
wherein the end wall forms a circumferentially extending ring-shaped ball head contact surface with the ball head between the circumferentially extending ring-shaped cover contact surface and the side wall.

9. The ball joint according to claim 8, wherein the ball head and the bearing shell have at least partially opposed curvatures before the housing cover is installed and after the housing cover is installed.

10. The ball joint according to claim 8, wherein the ball head and the end wall of the bearing shell, viewed in a longitudinal section through the ball joint, are at least partially oppositely curved.

11. The ball joint according to claim 8, wherein the first reinforcement portion is a projection which is configured to be fixed to the housing to thereby provide a fixed support for the first end of the side wall of the bearing shell.

12. The ball joint according to claim 8, wherein in an assembled state deformation of the end wall occurs and causes an actual change in shape of the end wall in which the radius of curvature increases in size from the initial radius of curvature.

\* \* \* \* \*